United States Patent
Nouri et al.

(10) Patent No.: US 11,973,927 B2
(45) Date of Patent: Apr. 30, 2024

(54) DETECTING EYE TRACKING CALIBRATION ERRORS

(71) Applicant: Hewlett-Packard Development Company, L.P., Spring, TX (US)

(72) Inventors: Joseph Nouri, Fort Collins, CO (US); Nathan Nuber, Fort Collins, CO (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 274 days.

(21) Appl. No.: 17/298,581

(22) PCT Filed: Mar. 13, 2019

(86) PCT No.: PCT/US2019/021989
§ 371 (c)(1),
(2) Date: May 30, 2021

(87) PCT Pub. No.: WO2020/185219
PCT Pub. Date: Sep. 17, 2020

(65) Prior Publication Data
US 2022/0021867 A1  Jan. 20, 2022

(51) Int. Cl.
*G06K 9/00* (2022.01)
*H04N 13/327* (2018.01)
(Continued)

(52) U.S. Cl.
CPC ......... *H04N 13/327* (2018.05); *H04N 13/344* (2018.05); *H04N 13/383* (2018.05)

(58) Field of Classification Search
CPC .. H04N 13/327; H04N 13/344; H04N 13/383; G02B 27/0093; G06F 3/013
See application file for complete search history.

(56) References Cited

U.S. PATENT DOCUMENTS 9,191,658 B2 * 11/2015 Kato ................ H04N 13/383
9,380,287 B2    6/2016 Nistico et al.
(Continued)

FOREIGN PATENT DOCUMENTS

CN    104067160 A    9/2014
CN    105247448 A    1/2016
(Continued)

OTHER PUBLICATIONS

Al-Rahayfeh, et al., Eye Tracking and Head Movement Detection: A State-of-Art Survey, IEEE Journal of Tranlational Engineering in Health and Medicine, Nov. 6, 2013, vol. 1, 2013, 12 pages.

*Primary Examiner* — Xin Jia
(74) *Attorney, Agent, or Firm* — Quarles & Brady LLP

(57) ABSTRACT

Computer-implemented methods, systems, apparatus, and computer-readable media (transitory or non-transitory) are described herein for detecting eye tracking calibration errors. In various examples, respective poses of first and second eyes of a wearer of a head-mounted display ("HMD") may be determined. A portion of a first image rendered on a first display of the HMD may be selected based on the pose of the first eye of the wearer. The selected portion of the first image may be matched to a portion of a second image rendered on a second display of the HMD. An eye tracking calibration error may be determined based on the pose of the second eye of the wearer and a location of the portion of the second image.

20 Claims, 5 Drawing Sheets

(51) Int. Cl.
*H04N 13/344* (2018.01)
*H04N 13/383* (2018.01)

(56) References Cited

U.S. PATENT DOCUMENTS

| | | |
|---|---|---|
| 9,910,282 B2 | 3/2018 | Petrov |
| 10,360,829 B2 * | 7/2019 | Lin .................... G02B 27/0172 |
| 10,942,567 B2 * | 3/2021 | Sun .......................... G06T 7/73 |
| 2005/0280603 A1 | 12/2005 | Aughey et al. |
| 2009/0189830 A1 | 7/2009 | Deering et al. |
| 2013/0128364 A1 | 5/2013 | Wheeler et al. |
| 2014/0333665 A1 | 11/2014 | Sylvan et al. |
| 2015/0288944 A1 | 10/2015 | Nistico et al. |
| 2016/0012643 A1 | 1/2016 | Kezele et al. |
| 2016/0134863 A1 | 5/2016 | Horesh |
| 2017/0078651 A1 | 3/2017 | Russell |
| 2017/0287447 A1 | 10/2017 | Barry et al. |
| 2017/0353714 A1 | 12/2017 | Poulad et al. |
| 2018/0011533 A9 | 1/2018 | Marggraff et al. |
| 2018/0101989 A1 * | 4/2018 | Frueh ...................... G06T 19/20 |
| 2018/0348861 A1 | 12/2018 | Uscinski et al. |

FOREIGN PATENT DOCUMENTS

| | | |
|---|---|---|
| JP | 2014112887 A | 6/2014 |
| WO | 2015/103444 A1 | 7/2015 |
| WO | WO-2017156486 A1 | 9/2017 |
| WO | 2017/209777 A1 | 12/2017 |

* cited by examiner

DETECTING EYE TRACKING CALIBRATION ERRORS

BACKGROUND

With some types of immersive computing, an individual wears a head-mounted display ("HMD") in order to have an augmented reality ("AR") and/or virtual reality ("VR") experience. One feature commonly employed with immersive computing is eye tracking. Eye tracking enables features such as user selection of virtual objects rendered in a VR landscape, foveated rendering, etc. However, it is unlikely that each time a person wears an HMD, the HMD is placed on the person's head in an identical manner as a previous session. Additionally, different users have different head shapes and sizes may wear the same HMD. Consequently, errors may arise with eye tracking, e.g., such that the perceived target of one eye's fovea is offset from a perceived target of the other eye's fovea.

BRIEF DESCRIPTION OF THE DRAWINGS

Features of the present disclosure are illustrated by way of example and not limited in the following figure(s), in which like numerals indicate like elements.

DETAILED DESCRIPTION

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used herein, the terms "a" and "an" are intended to denote at least one of a particular element, the term "includes" means includes but not limited to, the term "including" means including but not limited to, and the term "based on" means based at least in part on.

Additionally, it should be understood that the elements depicted in the accompanying figures may include additional components and that some of the components described in those figures may be removed and/or modified without departing from scopes of the elements disclosed herein. It should also be understood that the elements depicted in the figures may not be drawn to scale and thus, the elements may have different sizes and/or configurations other than as shown in the figures.

Figure 1:
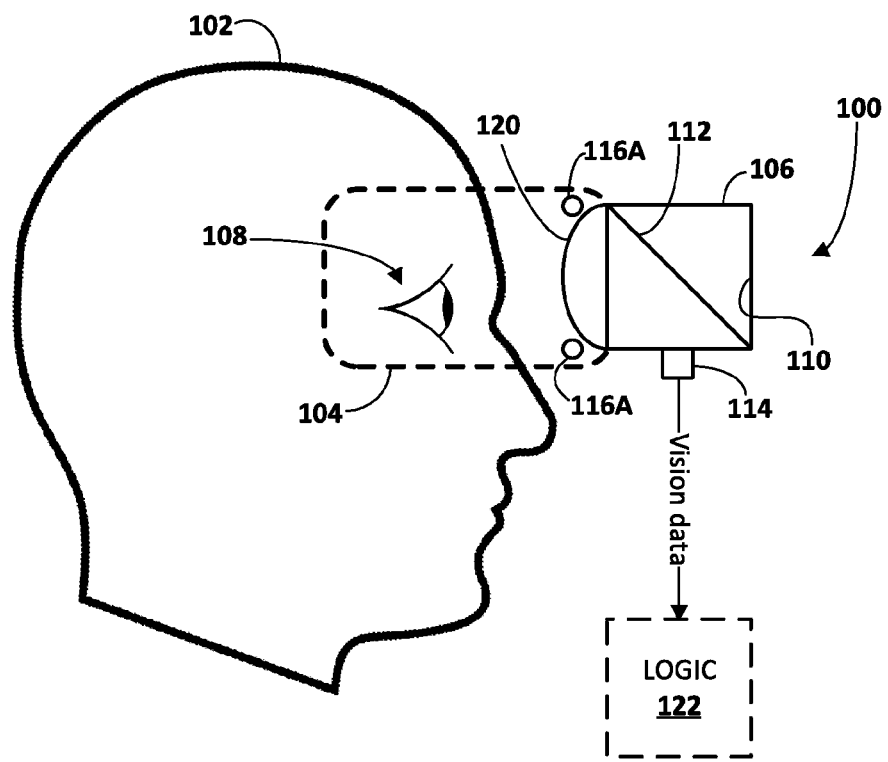
FIG. 1 depicts an example environment in which selected aspects of the present disclosure may be implemented.

Referring now to FIG. 1, an example head-mounted display ("HMD") 100 configured with selected aspects of the present disclosure is depicted schematically as it might be worn by an individual 102, which in the present context may also be referred to as a "user." In FIG. 1, HMD 100 includes a first housing 104 and a second housing 106. However, in other examples, other housing configurations may be provided. First housing 104 encloses, among other things, an eye 108 of individual 102, which in this case is the individual's right eye. Although not visible in FIG. 1 due to the viewing angle, in many examples, first housing 104 may also enclose another eye of individual 102, which in this case would be the individual's left eye.

Second housing 106 may include at least some of the electronics of HMD 100 that are operable to provide individual 102 with an immersive computing experience. For example, in FIG. 1, second housing 106 includes at least one display 110, which in many cases may include two displays, one for each eye 108 of individual 102, that collectively render content in stereo. Be rendering virtual content on display 110, HMD 100 provides individual 102 with a VR-based immersive computing experience in which individual 102 can interact with virtual objects, e.g., using his or her gaze. In some such examples, first housing 104 may completely enclose the eyes of individual 102, e.g., using a "skirt" of rubber, synthetic rubber, silicone, or other similar materials, in order to prevent outside light from interfering with the individual's VR experience.

In an example, HMD 100 may provide individual 102 with an augmented reality experience. For example, display 110 may be transparent so that individual 102 can see the physical world beyond display 110. Meanwhile, display 110 can be used to render virtual content, such as visual annotations of real world objects sensed by an external camera (not depicted) of HMD 100. In some such examples, HMD 100 may take the form of a pair of "smart glasses" with a relatively compact and/or light form factor. In some such examples, various components of FIG. 1 may be omitted, sized differently, and/or arranged differently to accommodate the relatively small and/or light form factor of smart glasses.

In some examples, including that of FIG. 1, second housing 106 includes a mirror 112 that is angled relative to second housing 106. Mirror 112 is tilted so that a field of view ("FOV") of a vision sensor 114 is able to capture eye 108 of individual 102. Light sources 116A and 116B are also provided, e.g., in first housing 104, and may be operable to emit light that is reflected from eye 108 to mirror 112, which redirects the light towards vision sensor 114.

Vision sensor 114 may take various forms. In some examples, vision sensor 114 may be an infrared ("IR") camera that detects electromagnetic radiation between 400 nm to 1 mm, or, in terms of frequency, from approximately 430 THz to 300 GHz. In some such examples, light sources 116 may take the form of IR light-emitting diodes ("LED"). Additionally, mirror 112 may be specially designed to allow non-IR light to pass through, such that content rendered on display 110 is visible to eye 108, while IR light is reflected towards vision sensor 114. For instance, mirror 112 may take the form of a dielectric mirror, e.g., Bragg mirror. Additionally or alternatively, mirror 112 may be coated with various materials to facilitate IR reflection, such as silver or gold. In other examples, vision sensor 114 (and light source 116A/B) may operate in other spectrums, such as the visible spectrum, in which case vision sensor 114 could be an RGB camera.

In yet other examples, vision sensor 114 may detect a beam of light such as a laser scanned across eye 108, e.g., by a diffractive optical element. In some such examples, mirror 112 may not necessarily be present, and vision sensor 114 may be situated, for example, in first housing 104 to provide a direct view of the light reflected from eye 108.

In some examples, various optics 120 may be provided, e.g., at an interface between first housing 104 and second housing 106. Optics 120 may serve various purposes and therefore may take various forms. In some examples, display 110 may be relatively small, and optics 120 may serve to magnify display 110, e.g., as a magnifying lens. Additionally or alternatively, in some examples, 120 optics may take the form of a Fresnel lens, which may be lighter, more compact, and/or most cost-effective than a traditional magnifying lens. Using a Fresnel lens may enable first housing 104 and/or second housing 106 to be manufactured into a smaller form factor.

HMD 100 may facilitate eye tracking in various ways. In some examples, light sources 116A-B may emit light into first housing 104. This emitted light may reflect from eye 108 in various directions, including towards mirror 112. As explained previously, mirror 112 may be designed to allow light emitted outside of the spectrum of light sources 116A-B to pass through, and may reflect light emitted within the spectrum of light sources 116A-B towards vision sensor 114. Vision sensor 114 may capture vision data that is then provided to logic 122 that is integral with, or remote from, HMD 100.

Logic 122 may execute various techniques for determining various aspects of eye 108, such as its pose (or orientation), dilation, etc. For example, a pose of eye 108 may be determined using techniques such as eye localization and/or eye gaze direction estimation, pattern matching, and so forth. In some examples, eye tracking may be based on corneal reflection points created, for instance, by light sources 116A-B, which can generate Purkinje images that may then be processed to estimate the user's gaze direction. Other eye tracking techniques that may be employed include but are not limited to shape-based methods, dark and bright pupil effects, eye models, and so forth. In some examples, a small diffractive optical element may be deployed that directs a beam of light such as a laser across eye 108. The reflected light signal may be measured and/or analyzed, e.g., by logic 122, to determine eye pose, position, etc.

Logic 122 may take various forms. In some examples, logic 122 may be integral with HMD 100, and may take the form of a processor (or multiple processors) that executes instructions stored in memory (not depicted). For example, logic 122 could include a central processing unit ("CPU") and/or a graphics processing unit ("GPU"). Additionally or alternatively, logic 122, when integral with HMD 100, may include an application specific integrated circuit ("ASIC"), a field-programmable gate array ("FPGA"), and/or other types of circuitry that are operable to perform logic operations. In this manner, logic 122 may be circuitry or a combination of circuitry and executable instructions.

In other examples, logic 122 may not be integral with HMD 100. In some examples, logic 122 may be integral with another device operated by individual 102, such as a smart phone, smart watch, laptop computer, desktop computer, set top box, and so forth. For example, logic 122 may include a processor of a smart phone carried by individual 102. Individual 102 may operably couple the smart phone with HMD 100 using various wired or wireless technologies, such as universal serial bus ("USB"), wireless local area networks ("LAN") that employ technologies such as the Institute of Electrical and Electronics Engineers ("IEEE") 802.11 standards, personal area networks, mesh networks, high-definition multimedia interface ("HDMI"), and so forth. Once operably coupled, individual 102 may wear HMD 100, which may render content that is generated by the smart phone on display 110 of HMD 100. For example, individual 102 could install a VR-capable game on the smart phone, operably couple the smart phone with HMD 100, and play the VR-capable game through HMD 100.

Based on the aspects of eye 108 determined from the vision information generated by vision sensor 114, such as a pose of eye 108, logic 122 may determine a point or target on display 110 at which a fovea of eye 108 is directed, i.e., at what portion of rendered content individual 102 is most focused. Various techniques may be used to identify this point; one non-limiting example is described with respect to FIG. 3.

This point or target on display 110 may be used, for instance, to render a cursor or other selection tool on display 110, e.g., so that individual 102 can move his eyes around to interact with content rendered on various portions of display 110. For example, to select a particular object rendered on display 110, individual 102 might look at the object and then perform some other action, such as blinking, pressing a button, etc., in order to interact with the rendered object.

As noted previously, HMD 100 may not be identically mounted on the head of individual 102 every single time. Moreover, HMD 100 may shift around on the head of individual 102 during use. And in many cases, different individuals may wear HMD 100, and each individual's eyes, faces, and/or heads may have different shapes and/or sizes. Even if specific eye tracking calibration profiles are set up for different users, there is no guarantee that the same user will wear HMD 100 the exact same way as they wore it when HMD 100 was initially calibrated for them. Consequently, the detected target (e.g., foveal vision center) of one eye may not match the detected target of the other eye, and it may not be clear what the user is focused on for purposes of detecting user interaction with rendered objects.

Techniques described herein facilitate detection of eye tracking calibration errors. In some examples, users can be apprised of these errors and take remedial action, such as performing manual recalibration. In some examples, techniques described herein may be used to generate a quantitative measure of an eye tracking calibration error, e.g., so that it can be communicated to the user. Users can then decide whether recalibration is warranted. In other examples, calibration errors detected using techniques described herein may be used to automatically recalibrate various aspects of HMD 100.

Figure 2B:
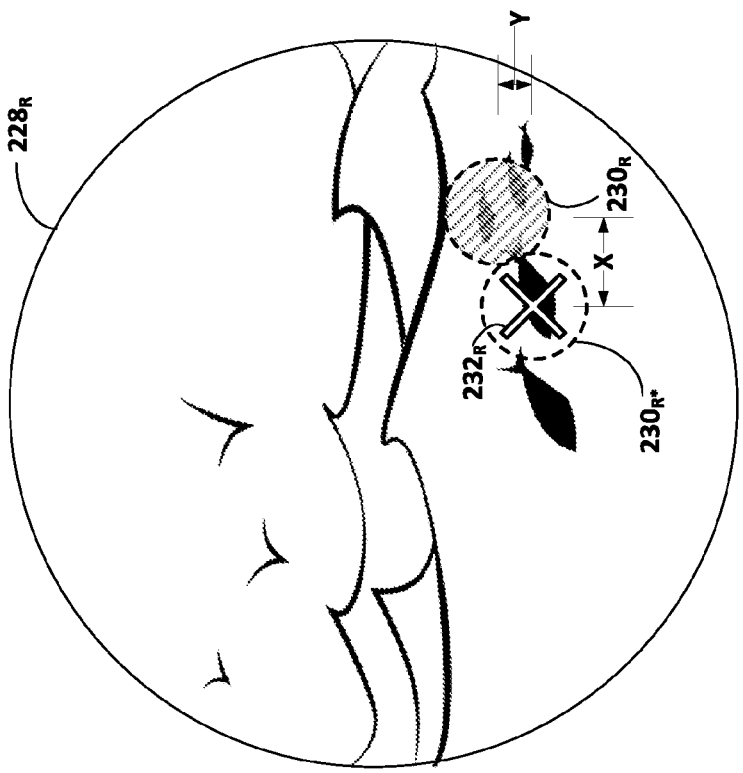
FIGS. 2A-D demonstrate an example of how disclosed techniques may be used to detect eye tracking calibration error.
Figure 2A:
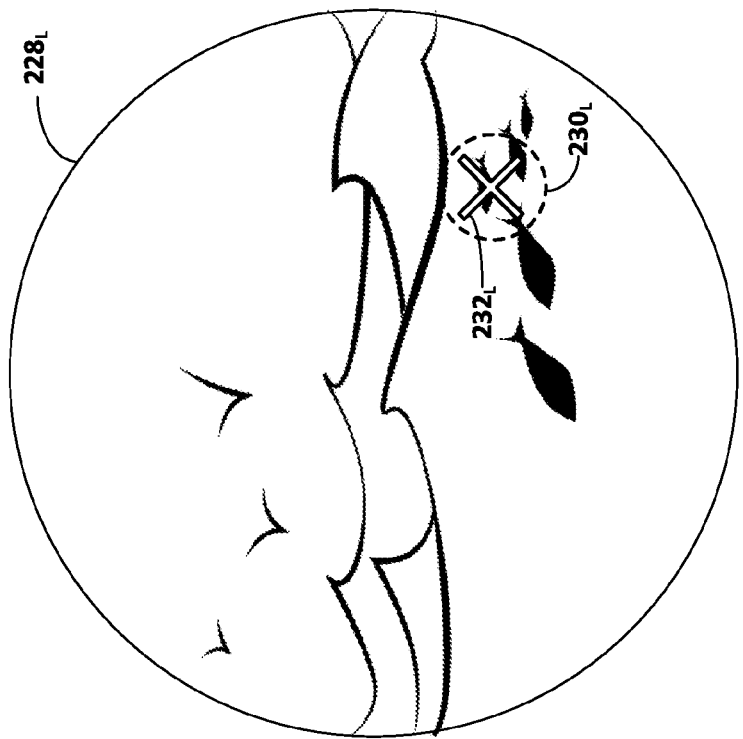

FIGS. 2A-D demonstrate one example of how eye tracking calibration errors may be detected. FIG. 2A depicts a left eye image $228_L$ as it might be rendered on a left eye display (110) in HMD 100. FIG. 2B depicts a right eye image $228_R$ as it might be rendered at the same time on a right eye display (110) in HMD 100, e.g., so that the user receives a stereo view of the rendered content. In FIG. 2A, eye tracking techniques are employed to determine that a portion $230_L$ of the left eye image $228_L$ is supposedly the focus of the user's left eye. In particular, a target $232_L$ in the shape of an X marks the particular location at which it is determined, e.g., using the eye tracking techniques described previously, the user's left eye supposedly is directed. From the location of target $232_L$, the portion $230_L$ of the left eye image $228_L$ may be extracted, e.g., by dilating outwards from the center of target $232_L$ by some predetermined distance/pixel count.

Once portion $230_L$ of left eye image $228_L$ is extracted, it may be matched to a matching portion $230_R$ of right eye image $228_R$. For example, pixel correspondence may be detected between portion $230_L$ and matching portion $230_R$ of right eye image $228_R$. Various techniques may be employed to perform this matching. For example, portion $230_L$ of left eye image $228_L$ may be used as a template in order to perform template matching on right eye image $228_R$. In some examples, the search space of right eye image $228_R$ may be reduced by virtue of the fact that left eye image $228_L$ and right eye image $228_R$ are, in many cases, perfectly aligned along a horizontal axis.

Additionally or alternatively, in some examples, techniques such as optical flow processing may be employed to match portion $230_L$ of left eye image $228_L$ with matching portion $230_R$ of right eye image $228_R$. Optical flow processing may facilitate inter-frame matching of data across multiple displays. For example, portion $230_L$ of left eye image may be matched with a corresponding portion $230_R$ of a right eye image $228_R$ that is rendered sometime after the left eye image $228_L$ from which portion $230_L$ was extracted, e.g., as a subsequent frame.

Figure 2D:
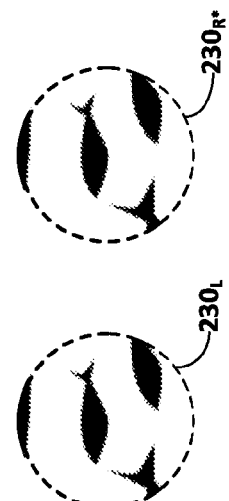
Figure 2C:
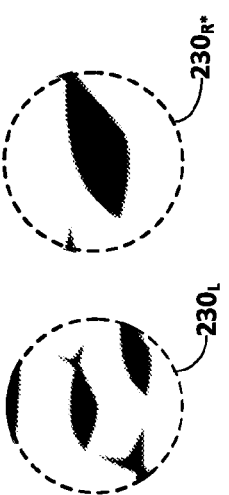

Whichever technique is employed to determine the match, an example of such a match is depicted in FIG. 2B, wherein content/pixels of matching portion $230_R$ of right eye image $228_R$ are found to match content/pixels of portion $230_L$ of left eye image $228_L$. However, in FIG. 2B, another target 232R in the shape of an X marks the particular location at which it is determined, e.g., using the eye tracking techniques described previously, the user's right eye supposedly is directed. Notably, target 232R is offset from a center point of portion $230_R$ by x horizontal units (e.g., pixels) and y vertical units. If the focus of the user's right fovea were determined from the location of target 232R alone, then a different portion $230_{R*}$ of right eye image might be extracted. As can be seen in FIG. 2C, portion $230_L$ of left eye image $228_L$ and different portion $230_{R*}$ of right eye image $228_R$ do not match.

Accordingly, the offset between target 232R and matching portion $230_R$ of second eye image $228_R$ may be used to determine an eye tracking calibration error. For example, the offset may be expressed as a single value, such as a vector calculated from the x and y offsets, or as multiple values in combination, such as the x and y offsets. The calibration error may be expressed in various units, such as pixels, inches, centimeters, millimeters, or some other unit that makes sense in the context of VR and/or AR immersive computing.

In some examples, output may be generated on display 110 of HMD 100 that notifies the user of the calibration error. It may be the user's prerogative whether they take remedial action, such as recalibrating, reorienting HMD 100 on their head, etc. In some examples, the calibration error may be displayed (or rendered audibly as the case may be) if it exceeds some threshold and, consequently, is likely to degrade the user's experience. If the calibration error is corrected, or there is no calibration error, then portion $230_L$ of left eye image $228_L$ may match different portion $230_{R*}$ of right eye image $228_R$, as depicted in FIG. 2D.

While in the example of FIGS. 2A-D a portion $230_L$ of left eye image $228_L$ is matched to a portion $230_R$ of right eye image $228_R$, this is not meant to be limiting. In various examples this could be reversed. For example, portion $230_R$ of right eye image $228_R$ could just as easily be matched to portion $230_L$ of left eye image $228_L$. Matching portions of images to other images using techniques described herein may use less computational resources than other techniques for eye tracking calibration, which often require knowledge of virtual object(s) rendered on display 110 as part of a virtual world.

Figure 3:
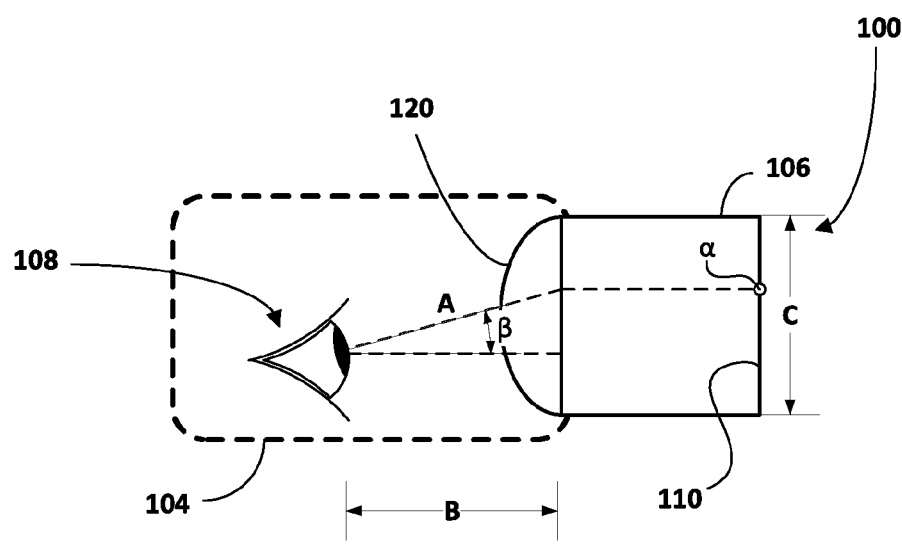
FIG. 3 demonstrates an example of how eye pose may be used to determine a target on images presented to a user wearing an HMD.

FIG. 3 demonstrates one non-limiting example of how a location on display 110 may be identified, at least in two dimensions. In FIG. 3, many of the components of HMD 100 have been omitted for the sake of clarity. In this example, eye tracking techniques determine that eye 108 has a gaze that tracks along the line A to a point in the top half of optics 120 (in this example, a lens). This line A is at an angle β from a horizontal line B from eye 108 to optics 120 that represents eye relief. Assuming the length of B is known, and assuming optics 120 takes the form of a perfect positive converging lens, it is possible to calculate a position a along an axis C at which eye 108 is focused, e.g., using trigonometric equation(s) such as the equation:

$$\alpha = B \times \tan(\beta)$$

Similar techniques may be employed to determine a horizontal position of eye 108 on display 110. Generally speaking, for any lens, the refraction angle through the lens may be determined empirically or using known lens equations.

Figure 4:
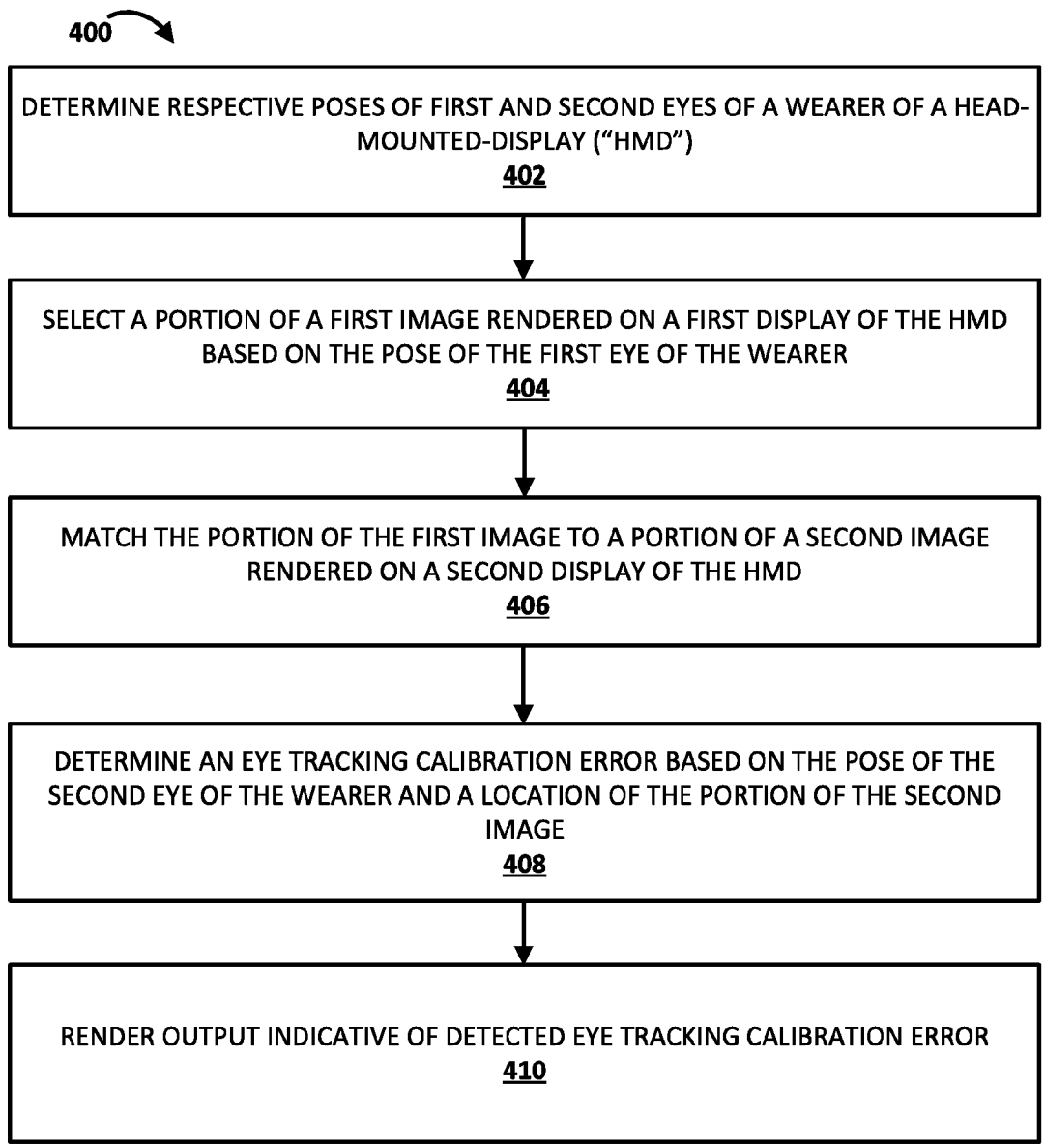
FIG. 4 depicts an example method for practicing selected aspects of the present disclosure.

FIG. 4 illustrates a flowchart of an example method 400 for practicing selected aspects of the present disclosure. The operations of FIG. 4 can be performed by a processor, such as a processor of the various computing devices/systems described herein, including logic 122. For convenience, operations of method 400 will be described as being performed by a system configured with selected aspects of the present disclosure. Other implementations may include additional operations than those illustrated in FIG. 4, may perform operations (s) of FIG. 4 in a different order and/or in parallel, and/or may omit various operations of FIG. 4.

At block 402, the system may determine respective poses of first and second eyes of a wearer of HMD 100 using various eye tracking techniques mentioned previously, such as pattern matching, corneal reflection points, shape-based methods, dark and bright pupil effects, eye models, and so forth. In some examples, the respective poses may be determined using data captured by vision sensor 114 integral with HMD 100. In other examples, a standalone vision sensor may be positioned relative the user's eye to determine its pose.

At block 404, the system may, based on the pose of the first eye of the wearer, select a portion (e.g., $230_L$) of a first image rendered on a first display of the HMD, such as left eye image $228_L$ in FIGS. 2A-D. Put another way, the system may identify a portion of the first image that is targeted by a first eye of a wearer of HMD 100. For example, a particular point or pixel of the first image may be identified as a target of the user's left fovea. This point(s) or pixel(s) may be expanded, e.g., by dilating outwards in all directions equally, to generate the select portion of the first image. While in examples described herein, this selected portion has been circular, this is not meant to be limiting. In other examples, the selected portion may take other shapes, such as rectangular, elliptical, etc.

At block 406, the system may match the portion of the first image selected at block 404 to a portion, e.g., $230_R$, of a second image rendered on a second display of the HMD, such as right eye image $228_R$ in FIGS. 2A-D. As noted previously, this matching may be performed using various techniques, including but not limited template matching and/or optical flow processing. And also as noted previously, while in these examples portion $230_L$ of left eye image $228_L$ is matched to a portion $230_R$ of right eye image $228_R$, this is not meant to be limiting. In other examples this could be reversed. For example, portion $230_R$ of right eye image $228_R$ could just as easily be matched to portion $230_L$ of left eye image $228_L$.

At block 408, the system may determine an eye tracking calibration error based on the pose of the second eye of the wearer and a location of the portion of the second image. For example, the system may determine an offset or distance between a target of the second eye, e.g., target 232R in FIG. 2B, and the location of the portion of the second image that matched the portion of the first image, e.g., $230_R$ in FIG. 2B. This offset may be directly or indirectly indicative of eye tracking calibration error. Put another way, the system may determine an eye tracking calibration error based on a comparison of the location of the portion of the second image that matched the portion of the first image and an aspect of second eye pose data generated for the second eye.

Once the eye tracking calibration error is determined, it may be used for various purposes. At block 410 of FIG. 4, for example, output is rendered, e.g., at display 110 of HMD 100, that is indicative of the detected eye tracking calibration error, e.g., so that individual 102 can be notified and take remedial action. As an example, the rendered output may include a visual indication, such as a number or other visual annotation such as an arrow, which indicates an offset between a target of a first eye and a location within an image displayed to the first eye that matches a foveal target portion of an image displayed to a second eye. In other examples, the output may be rendered on output components other than display 110, such as via a speaker that is integral with, or operably coupled to, HMD 100. Individual 102 may take various remedial actions in response to such output, such as readjusting HMD 100 on their head, initiating an eye tracking calibration routine, etc.

Figure 5:
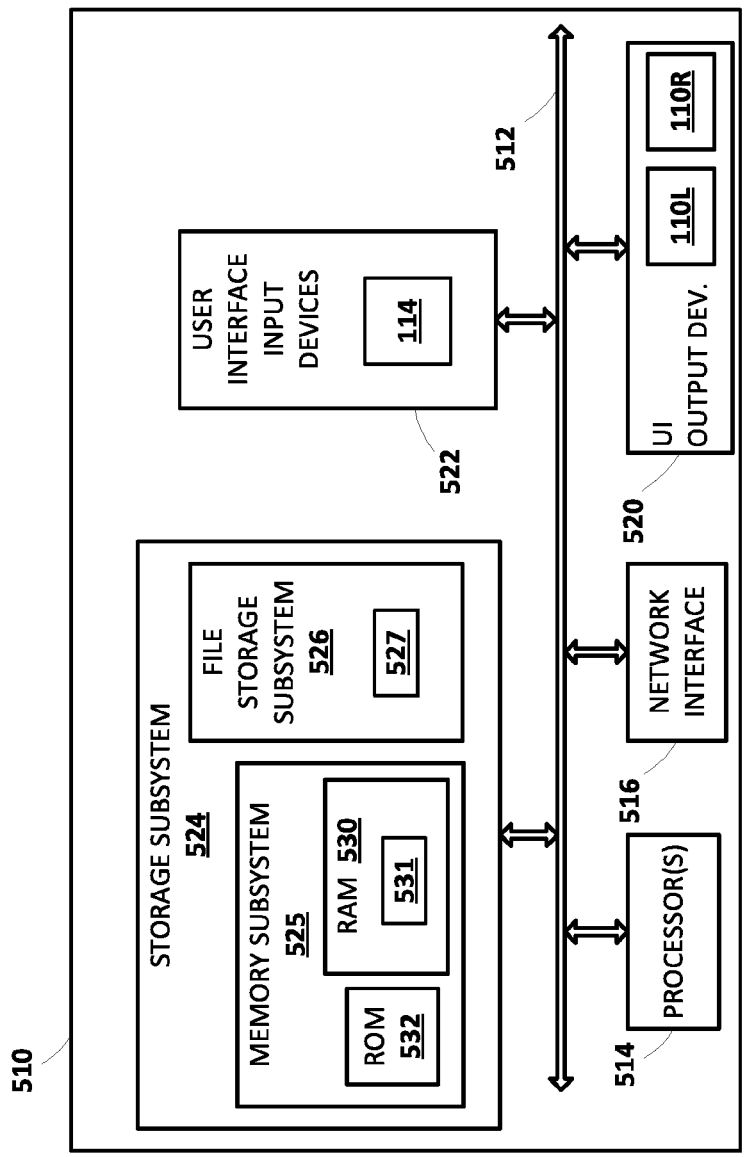
FIG. 5 shows a schematic representation of a computing device, according to an example of the present disclosure.

FIG. 5 is a block diagram of an example computer system 510, which in some examples be representative of components found on HMD 100. Computer system 510 typically includes at least one processor 514 which communicates with a number of peripheral devices via bus subsystem 512. These peripheral devices may include a storage subsystem 526, including, for example, a memory subsystem 525 and a file storage subsystem 526, user interface output devices 520, user interface input devices 522, and a network interface subsystem 516. The input and output devices allow user interaction with computer system 510. Network interface subsystem 516 provides an interface to outside networks and is coupled to corresponding interface devices in other computer systems.

User interface input devices 522 may include input devices such as a keyboard, pointing devices such as a mouse, trackball, a touch interaction surface, a scanner, a touchscreen incorporated into the display, audio input devices such as voice recognition systems, microphones, vision sensor 114, and/or other types of input devices. In general, use of the term "input device" is intended to include all possible types of devices and ways to input information into computer system 510 or onto a communication network.

User interface output devices 520 may include a display subsystem that includes left and right displays 110L, 110R, a printer, a fax machine, or non-visual displays such as audio output devices. The display subsystem may include a cathode ray tube ("CRT"), a flat-panel device such as a liquid crystal display ("LCD"), a projection device, or some other mechanism for creating a visible image. The display subsystem may also provide non-visual display such as via audio output devices. In general, use of the term "output device" is intended to include all possible types of devices and ways to output information from computer system 510 to the user or to another machine or computer system.

Storage subsystem 526 stores machine-readable instructions and data constructs that provide the functionality of some or all of the modules described herein. These machine-readable instruction modules are generally executed by processor 514 alone or in combination with other processors. Memory 525 used in the storage subsystem 524 can include a number of memories.

For example, a main random access memory ("RAM") 530 may be used during program execution to store, among other things, instructions 531 for performing eye tracking calibration error detection as described herein. Memory 525 used in the storage subsystem 524 may also include a read-only memory ("ROM") 532 in which fixed instructions are stored.

A file storage subsystem 526 can provide persistent or non-volatile storage for program and data files, including instructions 527 for performing eye tracking calibration error detection as described herein, and may include a hard disk drive, a floppy disk drive along with associated removable media, a CD-ROM drive, an optical drive, or removable media cartridges. The modules implementing the functionality of certain implementations may be stored by file storage subsystem 526 in the storage subsystem 526, or in other machines accessible by the processor(s) 514.

Bus subsystem 512 provides a mechanism for letting the various components and subsystems of computer system 510 communicate with each other as intended. Although bus subsystem 512 is shown schematically as a single bus, alternative implementations of the bus subsystem may use multiple busses.

Computer system 510 can be of varying types including a workstation, server, computing cluster, blade server, server farm, or any other data processing system or computing device. Due to the ever-changing nature of computers and networks, the description of computer system 510 depicted in FIG. 5 is intended only as a specific example for purposes of illustrating some implementations. Many other configurations of computer system 510 are possible having more or fewer components than the computer system depicted in FIG. 5.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration only and are not meant as limitations. Many variations are possible within the spirit and scope of the disclosure, which is intended to be defined by the following claims—and their equivalents—in which all terms are meant in their broadest reasonable sense unless otherwise indicated.

What is claimed is:

1. A method implemented using a processor, comprising:
   determining respective poses of first and second eyes of a wearer of a head-mounted display ("HMD");
   selecting a portion of a first image rendered on a first display of the HMD based on the pose of the first eye of the wearer;
   matching the portion of the first image to a portion of a second image rendered on a second display of the HMD; and
   determining an eye tracking calibration error based on the pose of the second eye of the wearer and a location of the portion of the second image.

2. The method of claim 1, wherein determining the eye tracking calibration error includes determining an offset between a target of the second eye determined from the pose of the second eye and the location of the portion of the second image.

3. The method of claim 1, wherein the portion of the first image is selected based on being a target of a fovea of the first eye.

4. The method of claim 1, wherein the matching comprises performing template matching.

5. The method of claim 1, wherein the matching comprises performing optical flow processing.

6. The method of claim 1, wherein the respective poses are determined using data captured by a vision sensor integral with the HMD.

7. The method of claim 1, wherein the processor is integral with the HMD.

8. The method of claim 1, wherein the processor is remote from the HMD.

9. A head-mounted display ("HMD"), comprising:
first and second displays visible to first and second eyes, respectively, of a wearer of the HMD; and
a processor operably coupled with the first and second displays, the processor to:
determine respective poses of the first and second eyes,
select a portion of a first image rendered on the first display based on the pose of the first eye of the wearer,
match the portion of the first image to a portion of a second image rendered on the second display, and
determine an eye tracking calibration error based on the pose of the second eye of the wearer and a location of the portion of the second image.

10. The HMD of claim 9, wherein the eye tracking calibration error is determined based on an offset between a target of the second eye determined from the pose of the second eye and the location of the portion of the second image.

11. The HMD of claim 9, wherein the portion of the first image is selected based on being a target of a fovea of the first eye.

12. The HMD of claim 9, wherein the portion of the first image is matched to the portion of the second image by a template matching.

13. The HMD of claim 9, wherein the portion of the first image is matched to the portion of the second image by an optical flow processing.

14. The HMD of claim 9, wherein the HMD comprises a vision sensor, the processor to determine the respective poses using data captured by the vision sensor.

15. A non-transitory computer-readable medium comprising instructions that, in response to execution of the instructions by a processor, cause the processor to:
determine respective poses of first and second eyes of a wearer of a head-mounted display ("HMD");
select a portion of a first image rendered on a first display of the HMD based on the pose of the first eye of the wearer;
match the portion of the first image to a portion of a second image rendered on a second display of the HMD; and
determine an eye tracking calibration error based on the pose of the second eye of the wearer and a location of the portion of the second image.

16. The non-transitory computer-readable medium of claim 15, wherein determining the eye tracking calibration error includes determining an offset between a target of the second eye determined from the pose of the second eye and the location of the portion of the second image.

17. The non-transitory computer-readable medium of claim 15, wherein the portion of the first image is selected based on being a target of a fovea of the first eye.

18. The non-transitory computer-readable medium of claim 15, wherein the matching comprises performing template matching.

19. The non-transitory computer-readable medium of claim 15, wherein the matching comprises performing optical flow processing.

20. The non-transitory computer-readable medium of claim 15, wherein the respective poses are captured by a vision sensor integral with the HMD.

* * * * *